(12) United States Patent
Kitagawa

(10) Patent No.: US 7,528,837 B2  
(45) Date of Patent: May 5, 2009

(54) DRAWING APPARATUS, DRAWING METHOD, DRAWING PROGRAM AND DRAWING INTEGRATED CIRCUIT

(75) Inventor: Daisaku Kitagawa, Suita (JP)

(73) Assignee: Panasonic Corporation, Osaka (JP)

( * ) Notice: Subject to any disclaimer, the term of this patent is extended or adjusted under 35 U.S.C. 154(b) by 199 days.

(21) Appl. No.: 11/359,332

(22) Filed: Feb. 22, 2006

(65) Prior Publication Data

US 2006/0188236 A1    Aug. 24, 2006

(30) Foreign Application Priority Data

Feb. 23, 2005    (JP)    ............................... 2005-046745

(51) Int. Cl.
  *G06F 13/00* (2006.01)
  *G06F 13/28* (2006.01)
  *G09G 5/36* (2006.01)

(52) U.S. Cl. ...................... 345/537; 345/545; 345/557; 345/533

(58) Field of Classification Search ................. 345/531, 345/537, 557, 545, 538, 533
  See application file for complete search history.

(56) References Cited

U.S. PATENT DOCUMENTS 5,909,225 A * 6/1999 Schinnerer et al. .......... 345/545  
6,141,025 A * 10/2000 Oka et al. .................... 345/531

* cited by examiner

*Primary Examiner*—Hau H Nguyen

(57) ABSTRACT

The present invention aims at, as to a drawing apparatus that stores an image in the frame memory via the cache memory, shortening the time period required for storing an entire image data in the frame memory. In the case where the frame memory is sectionalized in increments of the unit of pixels burst-transferred from the cache memory to the frame memory when partial data pieces of the image data to be eventually stored in the frame memory are stored in the cache memory, the drawing apparatus stores pixel data pieces for each sectionalized area in the cache memory in a manner that the cache memory needs to access the frame memory only once for each sectionalized area.

8 Claims, 14 Drawing Sheets

DRAWING APPARATUS, DRAWING METHOD, DRAWING PROGRAM AND DRAWING INTEGRATED CIRCUIT

BACKGROUND OF THE INVENTION

1. Field of the Invention

The present invention relates to image processing, especially to the usage of a frame memory and a cache memory for storing pixel data pieces of an image.

2. Description of the Related Art

Conventional apparatuses for performing image processing have adopted a method of storing image's pixel data pieces generated by a graphics engine once in the cache memory having a limited storage capacity, and subsequently storing, in the frame memory, the pixel data pieces stored in the cache memory.

While a frame memory is required to have a large storage capacity, a high-speed memory with a large storage capacity is very expensive. Accordingly, drawing apparatuses use a low-speed and inexpensive memory, such as a DRAM (Dynamic Random Access Memory), for the frame memory in the light of cost performance. Since the drawing process requires a longer time period if a low-speed memory is used as a frame memory, a high-speed memory is provided, as a cache memory, between the graphics engine and the frame memory, which thereby reduces the time for writing pixel data pieces to the frame memory. Because a high-speed memory is expensive as stated above, limiting the storage capacity of the cache memory reduces an increase of costs.

Images can be stored in the frame memory without using a cache memory. In this case, however, the graphics engine devotes much of the processing power to writing pixel data pieces to the frame memory, which makes it difficult to perform other tasks such as creating the next drawing data. The overall storage speed therefore slows down in the case of storing multiple sets of drawing data. Providing a cache memory between the graphics engine and the frame memory achieves high-speed writing from the graphics engine to the cache memory. This allows the graphics engine, for example, to prepare the next drawing data during the time until data once stored in the cache memory is written to the frame memory, leading to speed up in the overall writing process.

In the case of using a cache memory, a conventional technique improves its writing efficiency by reducing the number of writing operations from the graphics engine to the cache memory based on a shape of the target to be drawn.

In this regard, Japanese Laid-Open Patent Application Publication No. H1-262585 discloses a technological method of writing data to the cache memory for improving the efficiency. The method reduces the number of writing operations to the cache memory by expanding the two dimensional array of the cache memory, based on the shape of the image to be drawn, in the x-axis direction in the case that the drawing target is horizontally long, or in the y-axis direction in the case that the drawing target is vertically long.

According to the disclosed method, the time period required for the process of writing data from the graphics engine ultimately to the frame memory is shortened by reducing the number of writing operations from the graphics engine to the cache memory to be less than conventional, as described above. However, there is a call for a further shortening of the writing period of drawing apparatuses since an increase in the transfer time resulting from the enhancement of pixel quality is expected.

SUMMARY OF THE INVENTION

The present invention has been made in view of the above-stated demand, and aims at offering a drawing apparatus that reduces the time period required for the process of writing an image to the frame memory to be less than conventional.

[Means to Solve the Problem]

In order to solve the aforementioned problem, the drawing apparatus of the present invention comprises: a cache memory; an area specifying unit operable to specify an area of the frame memory for recording the image data; a recording unit operable to (i) determine partial image data pieces in the case where the frame memory is sectionalized into blocks each having the same storage capacity and a consecutive address, each of the partial image data pieces being a part of the image data and being to be recorded in a corresponding one of blocks including therein the specified area, and (ii) record each of the determined partial image data pieces in the cache memory; and a memory-to-memory transfer control unit operable to carry out a burst transfer of each of the partial image data pieces recorded in the cache memory to the corresponding one of blocks within the frame memory. Here, the "storage capacity" is the size of the block that can be accessed at one time when data is burst-transferred from the cache memory to the frame memory. If data for ten pixels can be transferred from the cache memory to the frame memory in one burst transfer, for example, each block in the frame memory has a storage capacity for data of ten pixels.

According to this structure, the pixel data pieces of a drawing target are stored in the cache memory in a manner that only one writing operation takes place for each block of the storage capacity in the frame memory. This eliminates the occurrence of two or more accesses from the cache memory to each block in the frame memory.

The method disclosed in Japanese Laid-Open Patent Application Publication No. H1-262585 does not make consideration for the writing operations from the cache memory to the frame memory, although improving its writing efficiency by reducing the number of writing operations from the graphics engine to the cache memory. Therefore, unnecessary writing operations from the cache memory to the frame memory occur, which results in a problem that the process of writing an image in the frame memory takes longer time. This is because storage of the pixel data pieces from the cache memory to the frame memory is achieved by burst transfers, and therefore, when the pixel data pieces are going to be written to the frame memory, it is sometimes the case that accesses are made redundantly for some blocks of the frame memory, depending on the way that the pixel data pieces are written to the cache memory. Redundant accesses to the same blocks, i.e. accessing at least twice to each of the same blocks, means an increase in the time period required for the writing process from the graphics engine to the frame memory.

Eliminating the conventional redundancy of burst transfer accesses from the cache memory to blocks in the frame memory means a decrease in the number of accesses from the cache memory to the frame memory, which naturally leads to shortening the time period required for the entire image data to be stored in the frame memory.

In addition, the recording unit of the drawing apparatus may record, within the cache memory, the determined partial image data pieces in recording areas having consecutive addresses.

According to the structure, as compared to the case of storing the pixels of one block at random, storing the pixels of one block under consecutive addresses of the cache memory allows an easy control, eliminating needs for a process that specifies to where a pixel data piece under which address is stored through a burst transfer. As a result, the overall time period required for the writing operations from the cache memory to the frame memory can be shortened.

As to the drawing apparatus, the storage capacity may be determined based on the number of signal lines of a memory bus connecting the cache memory to the frame memory.

Alternatively, the storage capacity may be determined based on the data volume that can be transferred in the burst transfer.

According to the structure, the size of the blocks is determined based on the unit of burst transfers, or by the number of signal lines of the memory bus connecting the cache memory to the frame memory. When the size or the blocks is determined by the unit of burst transfers, redundant writing operations to the same blocks in the frame memory—i.e. two or more accesses from the cache memory to each of the same blocks in the frame memory—are removed, and thus, the present invention is capable of shortening the overall time period required for the writing operations to the frame memory by reducing the number of accesses from the cache memory to the frame memory, as compared to a conventional technique.

As to the drawing apparatus, the storage capacity of the cache memory may be an integral multiple of the storage capacity.

Setting the storage capacity of the cache memory to an integral multiple of the storage capacity of one block, to which pixel data pieces of one burst transfer are to be written, allows an easy control over the transfer process. Consequently, this avoids the drawing apparatus becoming complex, and also shortens the overall time period required for the writing operations to the frame memory, even if by a small amount.

The present invention can be a recording method for recording image data in a frame memory via a cache memory, comprising the steps of: specifying an area of the frame memory for recording the image data; determining partial image data pieces in the case where the frame memory is sectionalized into blocks each having the same storage capacity and a consecutive address, each of the partial image data pieces being a part of the image data and being to be recorded in a corresponding one of blocks including therein the specified area, and recording each of the determined partial image data pieces in the cache memory; and burst-transferring each of the partial image data pieces recorded in the cache memory to the corresponding one of blocks within the frame memory.

The present invention can be a recording program used in a drawing apparatus that records image data in a frame memory via a cache memory and causing a computer to execute the steps of: specifying an area of the frame memory for recording the image data; determining partial image data pieces in the case where the frame memory is sectionalized into blocks each having the same storage capacity and a consecutive address, each of the partial image data pieces being a part of the image data and being to be recorded in a corresponding one of blocks including therein the specified area, and recording each of the determined partial image data pieces in the cache memory; and burst-transferring each of the partial image data pieces recorded in the cache memory to the corresponding one of blocks within the frame memory.

When this method is executed by a drawing apparatus, or the program is executed by the computer of a drawing apparatus, the drawing apparatus writes to the cache memory pixel data pieces to be transferred in one burst transfer without fail. This eliminates the occurrence of two or more accesses from the cache memory to the same blocks in the frame memory. As a result, the time period required for storing the drawing pixel data pieces in the frame memory is shortened.

The present invention can be a drawing integrated circuit that records image data in a frame memory via a cache memory, comprising: an area specifying unit operable to specify an area of the frame memory for recording the image data; a recording unit operable to (i) determine partial image data pieces in the case where the frame memory is sectionalized into blocks each having the same storage capacity and a consecutive address, each of the partial image data pieces being a part of the image data and being to be recorded in a corresponding one of blocks including therein the specified area, and (ii) record each of the determined partial image data pieces in the cache memory; and a memory-to-memory transfer control unit operable to carry out a burst transfer of each of the partial image data pieces recorded in the cache memory to the corresponding one of blocks within the frame memory.

By equipped with this integrated circuit, the drawing apparatus becomes capable of performing a control over the writing operations so that the drawing apparatus writes to the cache memory pixel data pieces to be transferred in one burst transfer without fail. Performing the control eliminates the occurrence of two or more burst transfer accesses from the cache memory to the same blocks in the frame memory, and as a result, the time period required for storing the drawing pixel data pieces in the frame memory can be shortened, as compared to a conventional technique.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings.

DESCRIPTION OF THE PREFERRED EMBODIMENT

Figure 1:
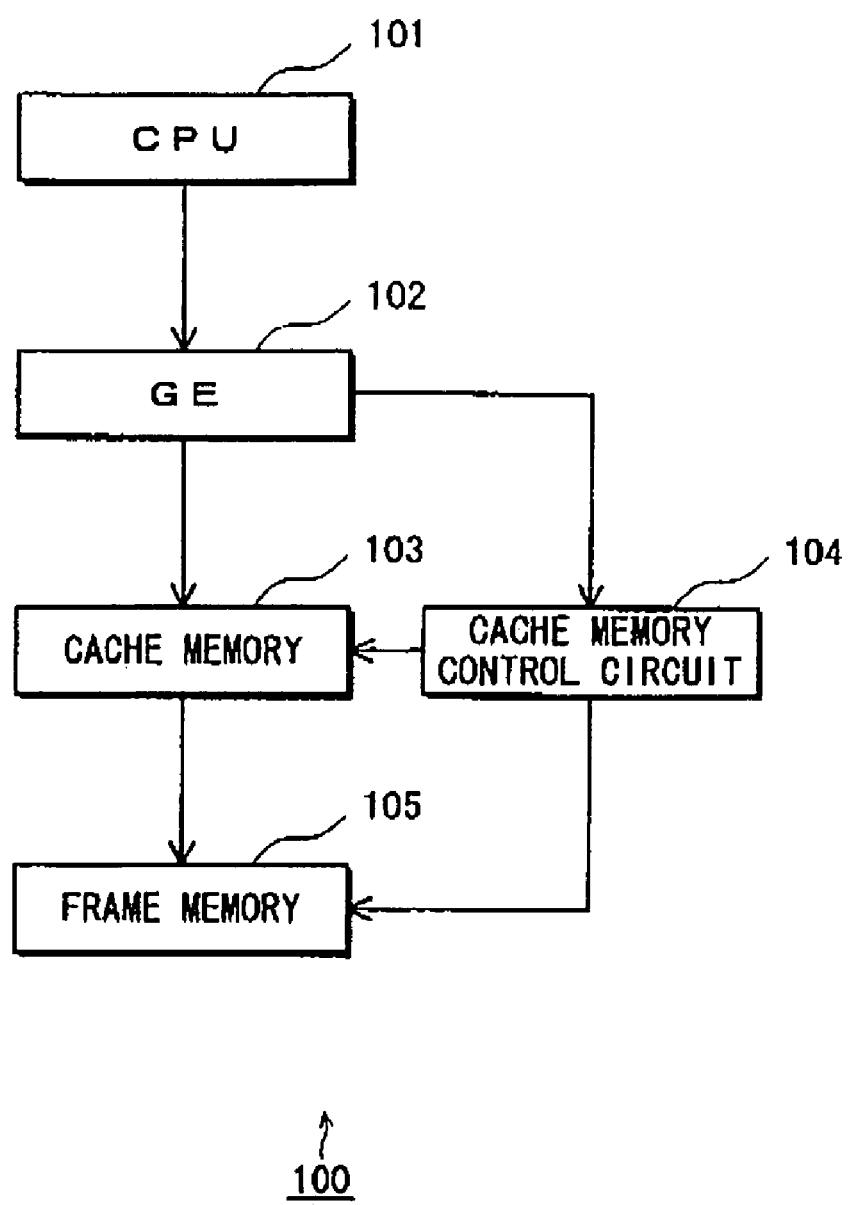
FIG. 1 is a block diagram showing a functional structure of a drawing apparatus according to the present invention.

A drawing apparatus of the present invention is described below with the aid of drawings.

<Overview>

The transfer from the cache memory to the frame memory is conventionally performed by burst transfers. However, depending on how to store data in the cache memory, cuts made when an image is sectionalized into parts for the transfer may fall within units of the burst transfers. As a result, it is sometimes the case that two burst transfer accesses from the cache memory to the same areas in the frame memory are made, although the contents of data being transferred are different each time (refer to a cross-hatched region 801 in FIG. 8; the detail is hereinafter described).

The present invention focuses attention on the unit of burst transfers for the writing operations from the cache memory to the frame memory. Here, at least all pixel data pieces to be transferred in one burst transfer are stored in the cache memory as a part of drawing data formed by a drawing direction from the graphics engine so that, under one drawing direction, two or more accesses from the cache memory will not occur with each address in the frame memory in one burst transfer.

This prevents a further access to areas in the frame memory which the cache memory has already accessed in one burst transfer. Accordingly, under the conditions of using a low-speed frame memory which needs to have a large storage capacity and a high-speed cache memory with a limited storage capacity used for creating drawing data, the present invention is able to shorten the time period required for the process starting with transmitting a drawing direction from the CPU and ending with storing all pixel data pieces corresponding to the drawing direction in the frame memory, as compared to a conventional technique.

A specific explanation is given next.

<Structure>

FIG. 1 is a block diagram showing a functional structure of a drawing apparatus 100.

As shown in the figure, the drawing apparatus 100 comprises: a CPU (Central Processing Unit) 101; a GE (Graphics Engine) 102; a cache memory 103; a cache memory control circuit 104; and a frame memory 105.

The CPU 101 has a function of transmitting drawing directions to the GE 102. For example, the CPU 101 transmits a drawing direction indicating "to draw in red a triangle formed by connecting three points, A(21, 3), B(5, 9) and C(29, 7) with straight lines" and including parameters such as a graphic figure type and coordinate values. In terms of colors, here, each pixel data piece represents one of the RGB colors, where red has two-tone levels; green, four; and blue, two.

The GE 102 has almost the same function as a conventional GE, i.e. receiving a direction transmitted from the CPU 101, performing calculation to determine which color is actually positioned on which coordinate point, and sequentially writing data created through the calculation to the cache memory. Note however that the way of writing the data to the cache memory differs from a conventional technique, and the detail is described later in the sections of <Data> and <Operations>.

The cache memory 103 is a memory having a function of temporarily storing pixel data pieces written by the GE 102, and is characterized by high access speed yet its storage capacity being limited. Additionally, the cache memory 103 also has a function of transferring the pixel data pieces stored therein to the frame memory 105.

Figure 2:
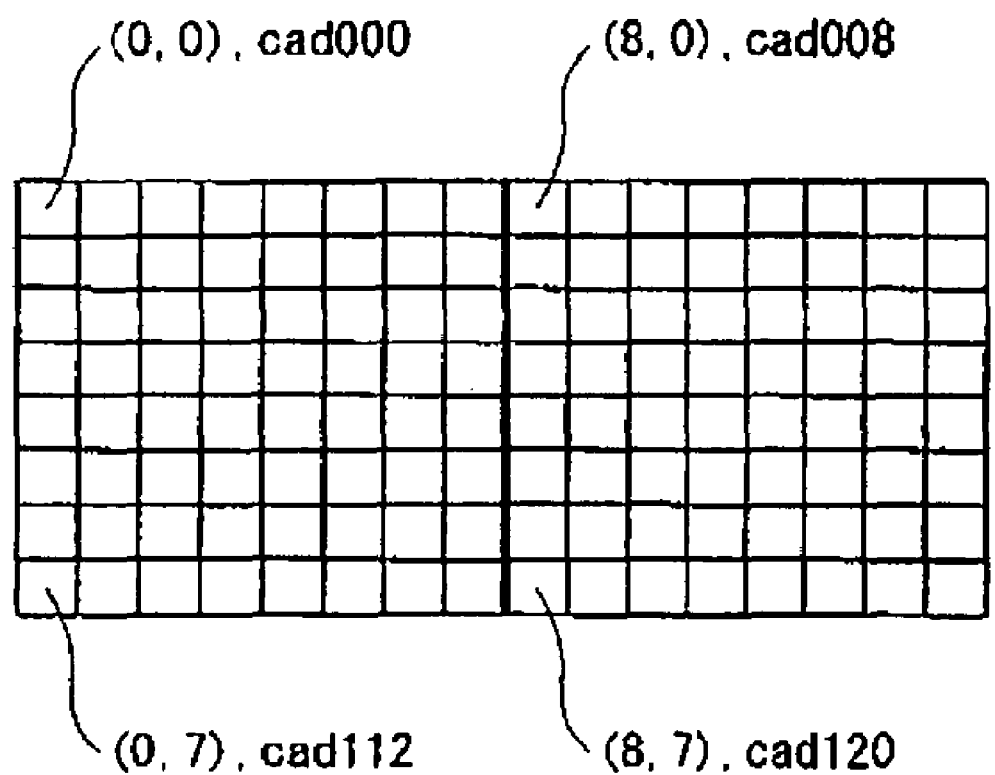
FIG. 2 is a conceptual diagram of a cache memory for storing part of or all of an image.

In the present embodiment, assume that the cache memory 103 is a two-dimensional array, as shown in FIG. 2, for easier comprehension. As shown in the figure, the cache memory 103 is a memory capable of storing pixel data pieces for a 16-by-8 coordinate system, which includes a total of 128 pixels. One grid corresponds to one pixel data piece. Numerical values assigned to a pixel in the figure represent a coordinate point of the pixel and its address within the cache memory 103. For example, "(0, 0), cad000" indicates that the coordinate point (0, 0) corresponds to the #000 address in the cache memory. Note that coordinate points of the cache memory 102 do not basically correspond to those of the frame memory 105.

The cache memory control circuit 104 controls the transfer of pixel data pieces from the cache memory 103 to the frame memory 105, and has a function of transferring pixel data pieces stored in the cache memory 103 to storage locations in the frame memory 105 based on a direction from the GE 102. The cache memory control circuit 104 can be achieved with a DMA (Direct Memory Access) controller, for example.

The frame memory 105 is a memory having a function of storing final drawing data. Contrary to the cache memory 103, the frame memory 105 is characterized by low access speed yet a large storage capacity.

Figure 3:
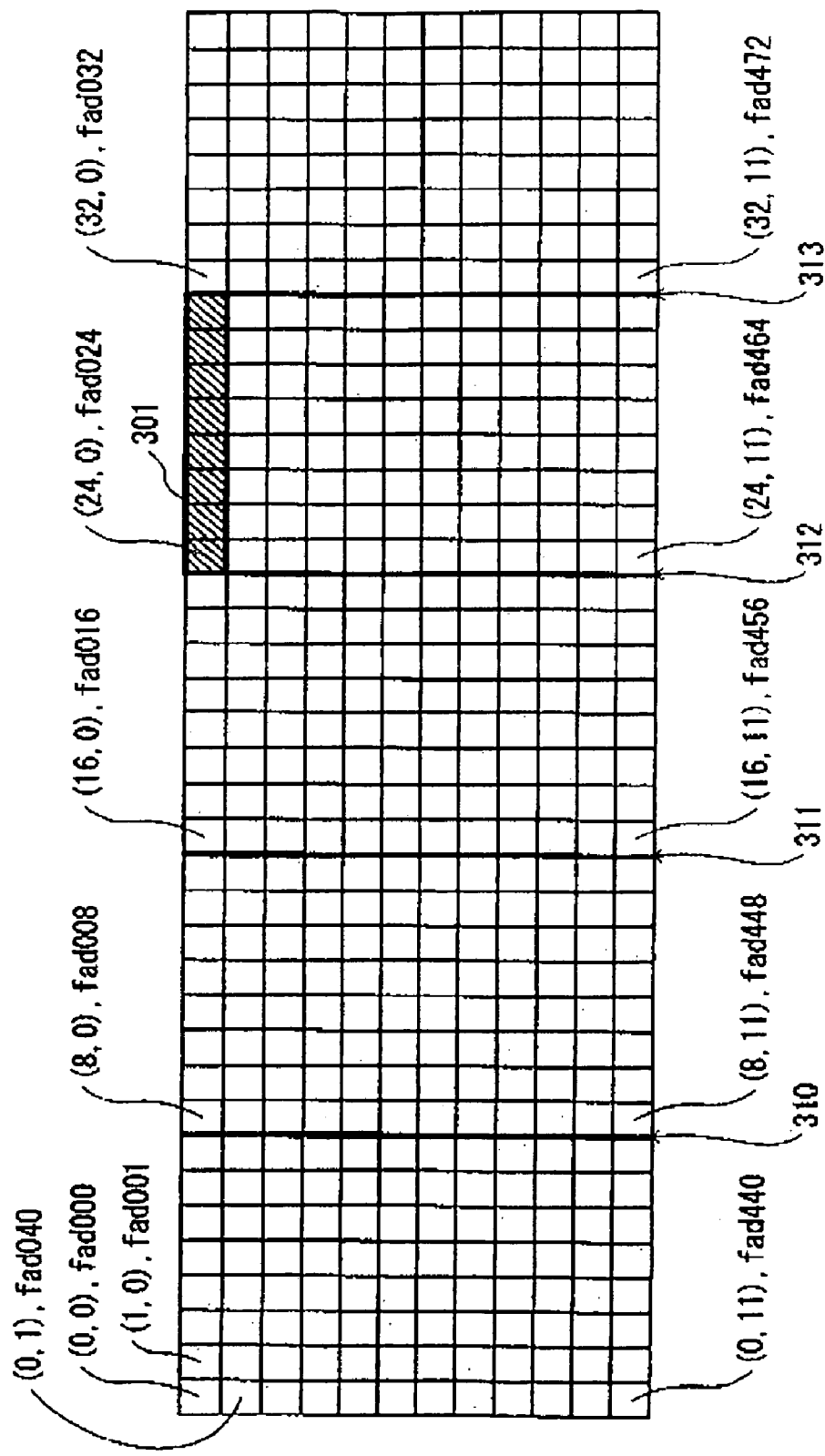
FIG. 3 is a conceptual diagram of a frame memory of the drawing apparatus.

The frame memory 105 is a memory with a two-dimensional array, as shown in FIG. 3. As shown in the figure, the frame memory 105 here is capable of storing pixel data pieces for a 40-by-12 array, which includes a total of 480 pixels. One grid corresponds to one pixel data piece. A shaded area 301 in the figure represents one unit of the burst transfers, and pixel data pieces are transferred from the cache memory 103 to the frame memory 105 in increments of eight pixels. The unit of the burst transfers, here eight pixels, is decided based on the number of signal lines in the memory bus connecting the cache memory 103 to the frame memory 105 and the number signal lines in the memory bus necessary to burst-transfer one pixel data piece.

Note that numerical values assigned to a pixel in the figure represent a coordinate point of the pixel and its address within the frame memory 105. For example, "(0, 0), fad000" indicates that the coordinate point (0, 0) corresponds to the #000 address in the frame memory. Note that FIG. 3 shows correspondences between coordinate points and their addresses with respect only to some representative pixels.

In addition, heavy lines 310, 311, 312 and 313 represent conceptual boundaries created by the burst transfers, and the present invention is characterized by some of these boundaries being situated on both edges of the respective areas written to the cache memory.

<Data>

Next is described how to store data in the cache memory and the frame memory, with the aid of a specific example and drawings. In order to illustrate differences between the present invention and the conventional method, the data storage according to the conventional method is first described with the aid of FIGS. 5 to 9, and then the data storage according to the present invention is described with the aid of FIGS. 10 to 13.

Figure 4:
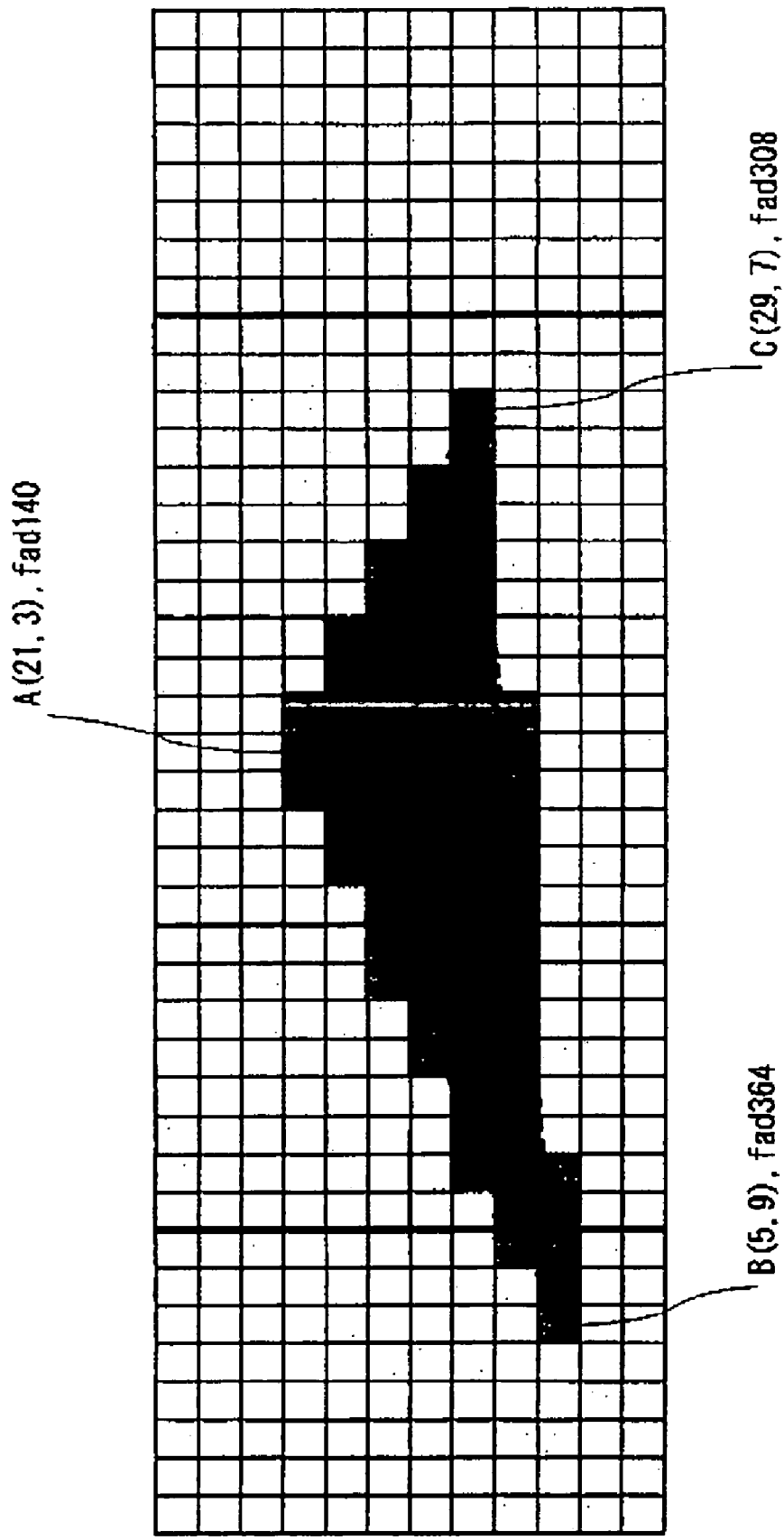
FIG. 4 shows an example of an image to be written to the frame memory by a graphics engine.
Figure 5:
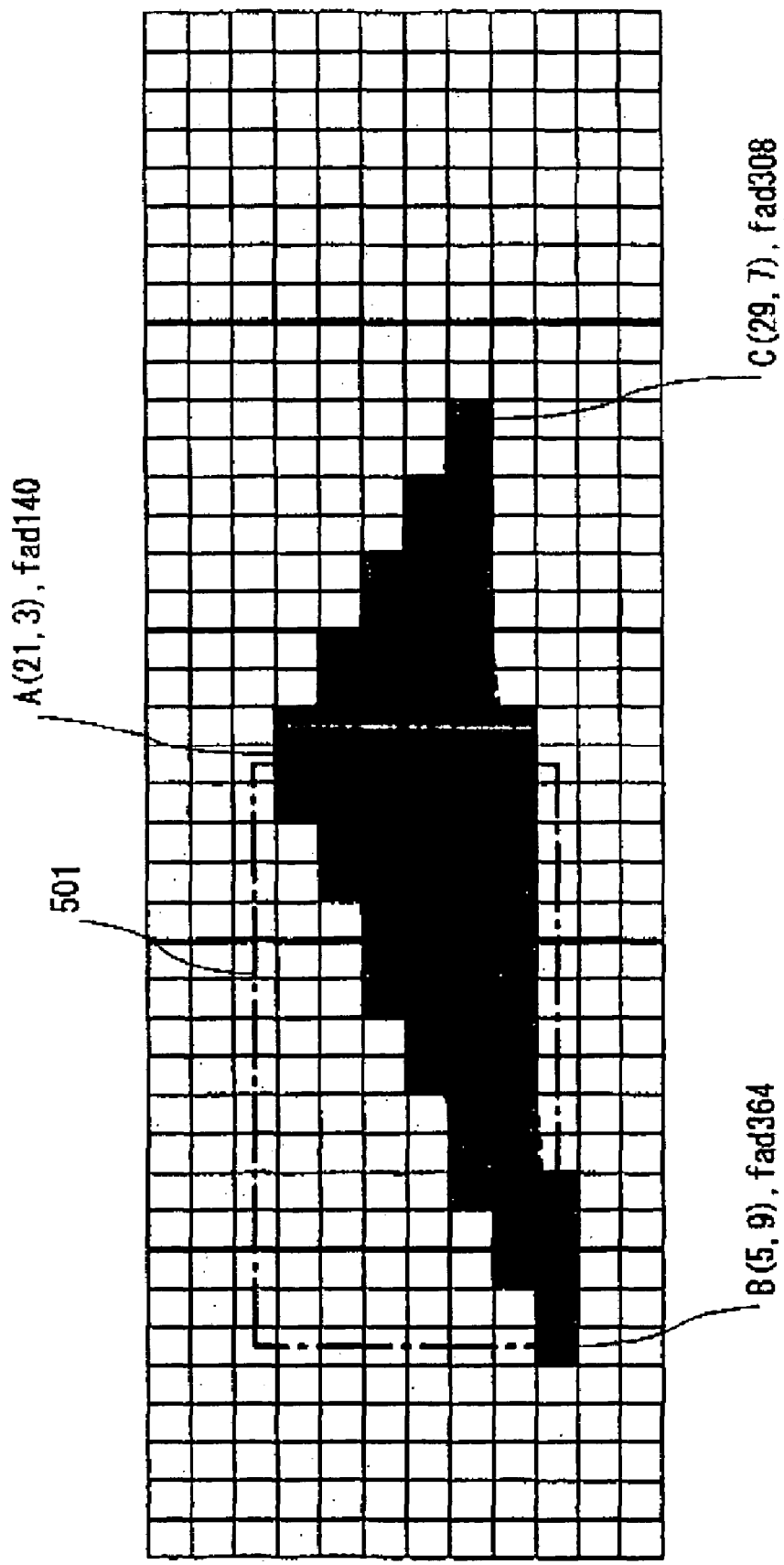
FIG. 5 shows, within a graphic figure to be eventually written to the frame memory, an area to be written to the cache memory according to a conventional method.
Figure 6:
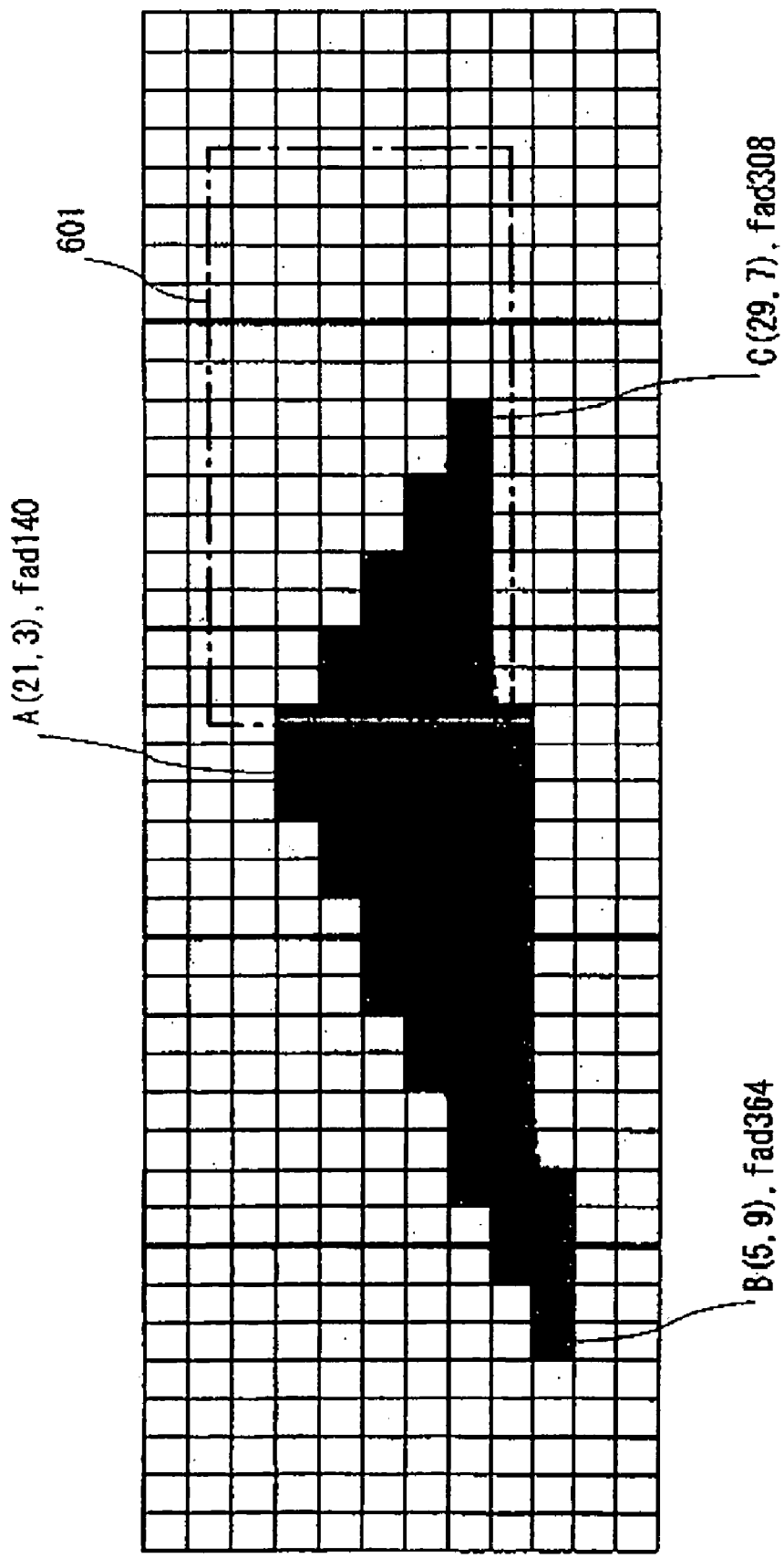
FIG. 6 shows, within the graphic figure to be eventually written to the frame memory, another area to be written to the cache memory according to the conventional method.

Here, both the conventional method and the present invention are described for the case where the pixel data pieces of a triangle ABC having three apexes A, B and C, as shown in FIG. 4, are eventually stored in the frame memory 105.

Here is explained the data storage according to the conventional method. According to the conventional method, an endpoint in the data to be drawn is detected so that as much drawing area as possible will be stored in the cache memory at the start, and the drawing area is stored in the cache memory in a manner that this endpoint also remains as an endpoint in the cache memory. In the case shown in FIG. 5, an area 501 marked with a chain line is the drawing area. Subsequently, the remaining part is also stored in the cache memory in a similar fashion. In this instance, this second drawing area is an area 601 shown in FIG. 6.

Figure 7A:
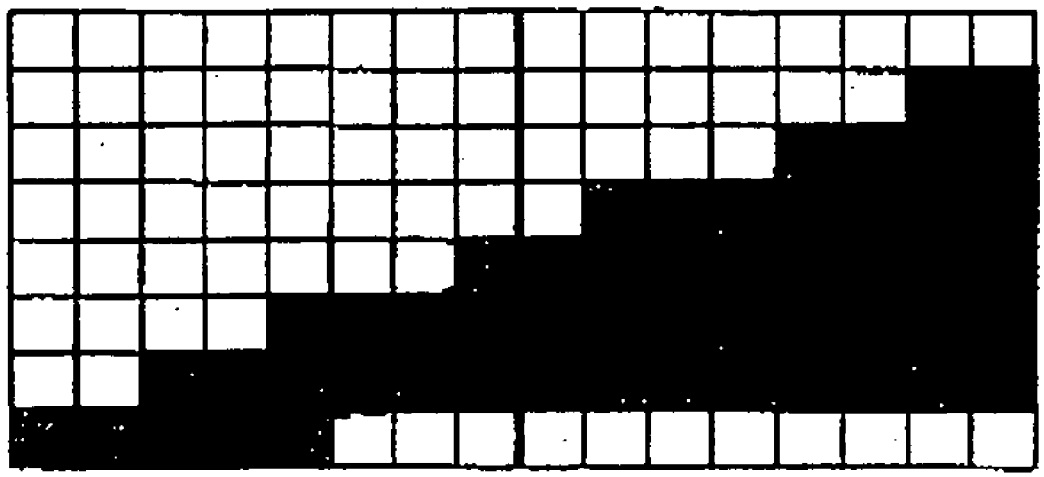
FIG. 7 shows states of pixel data pieces when stored in the cache memory according to the conventional method, with FIG. 7A for the area shown in FIG. 5 and FIG. 7B for the area shown in FIG. 6.
Figure 7B:
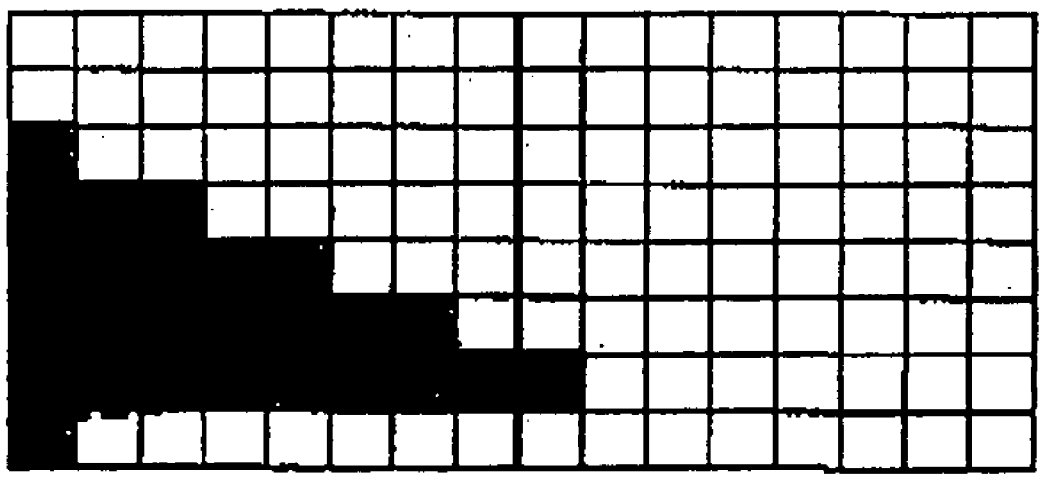

FIG. 7 shows states of pixel data pieces of the areas 501 and 601 being stored in the cache memory. FIG. 7A shows the state of the pixel data pieces of the area 501 being stored while FIG. 7B showing the state of the pixel data pieces of the area 601 being stored.

Figure 8:
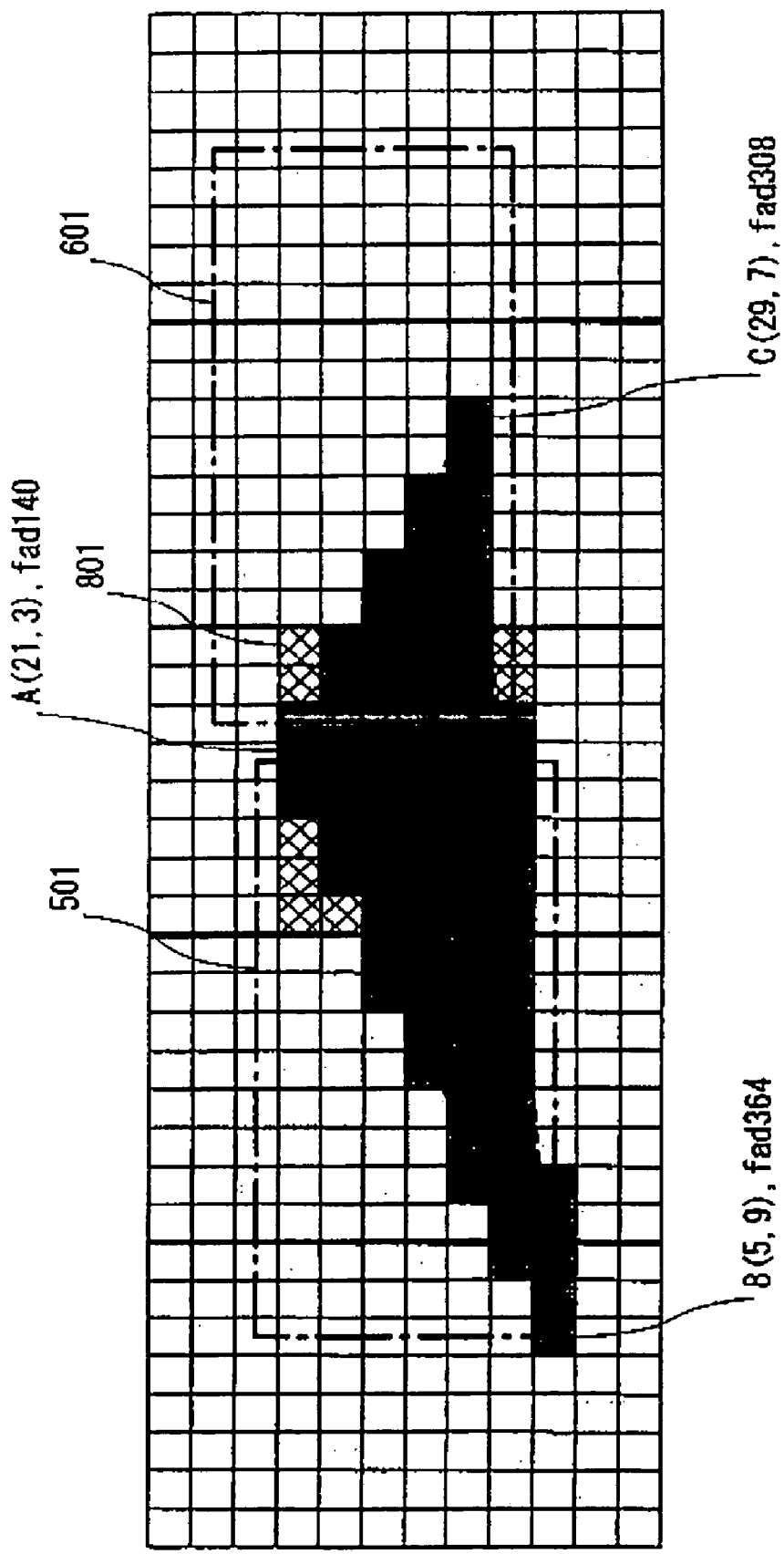
FIG. 8 shows occurrence of redundant accesses at the time of transfer from the cache memory to the frame memory in the case that the storage to the cache memory has been carried out according to the conventional method.

In the case that the data has been stored in the cache memory in this way, the cross-hatched section 801 of FIG. 8 is accessed redundantly twice because an access is made for each of the areas 501 and 601 at the time of the writing operations from the cache memory to the frame memory due to the data being split up within a unit of the burst transfers. In this instance, a total of six accesses are redundantly made.

Figure 9A:
FIG. 9 is a conceptual diagram showing the number of accesses made to the frame memory from the cache memory in the conventional method.
Figure 9B:

In terms of the number of accesses, in the case of FIG. 7A, thirteen accesses from the cache memory to the frame memory occur as shown in FIG. 9A. In the case of FIG. 7B, nine accesses are generated as shown in FIG. 9B. In short, totally twenty two accesses from the cache memory to the frame memory take place.

The data stored in the frame memory is output to, for example, an LCD connected to the drawing apparatus 100.

Next is explained the case according to the present invention.

Figure 10:
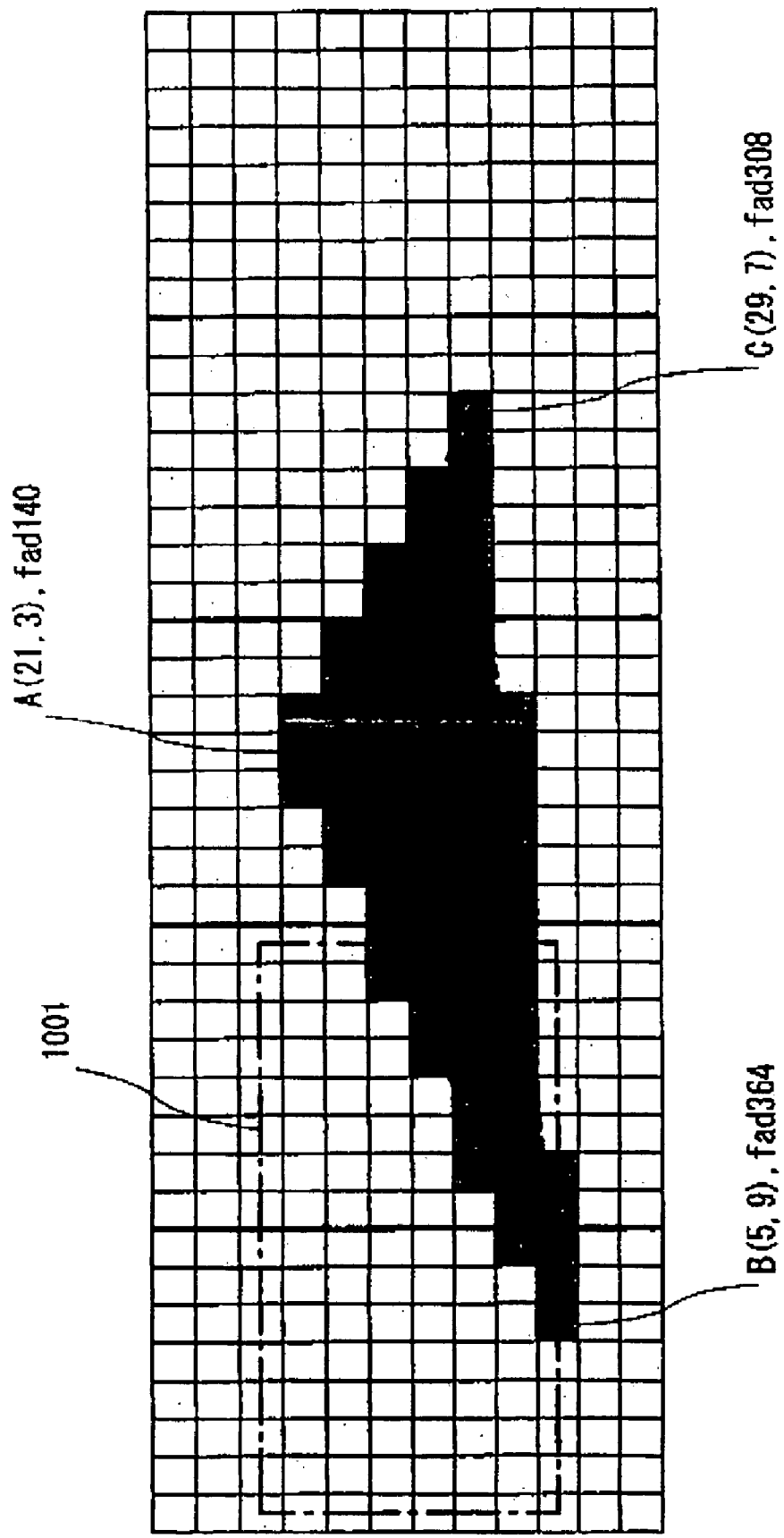
FIG. 10 shows an area to be written to the cache memory according to a method of the present invention.

The present invention takes note of the unit of the burst transfers, and the pixel data pieces within an area 1001 are first written to the cache memory, as shown in FIG. 10. Subsequently, the remaining part, the pixel data pieces within an area 1101 shown in FIG. 11, is stored in the cache memory.

Figure 11:
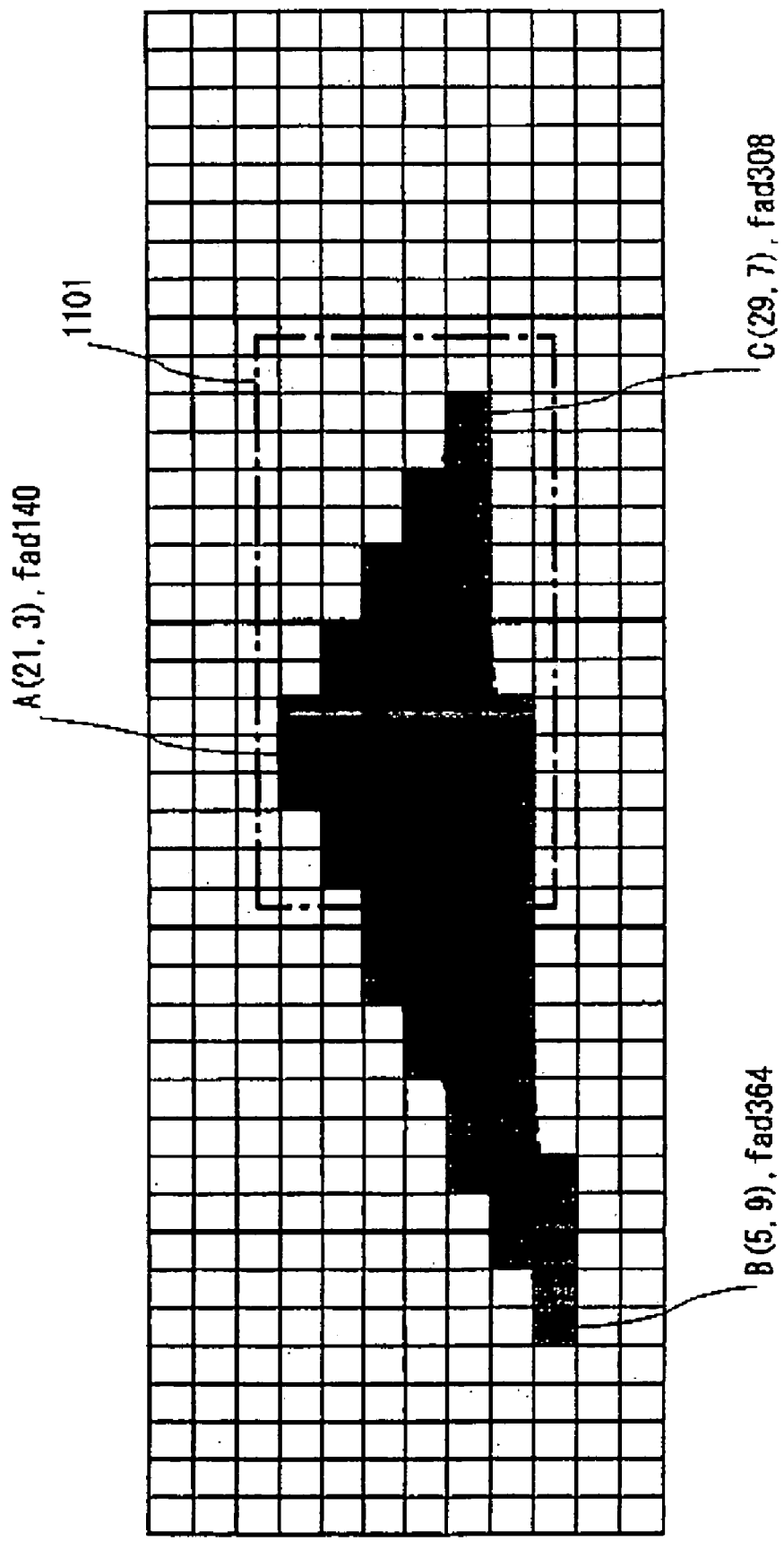
FIG. 11 shows another area to be written to the cache memory according to the method of the present invention.
Figure 12A:
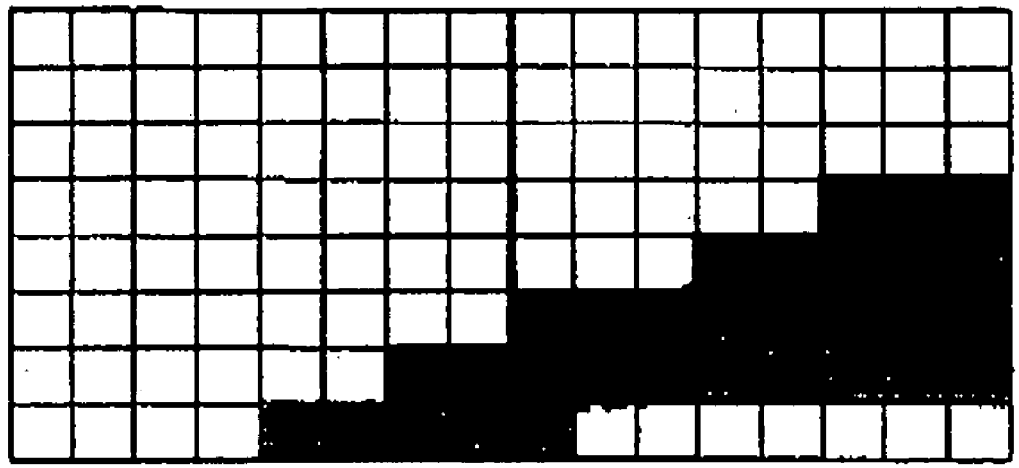
FIG. 12 shows state of pixel data when stored in the cache memory according to the method of the present invention, with FIG. 12A for the area shown in FIG. 10 and FIG. 12B for the area shown in FIG. 11.
Figure 12B:
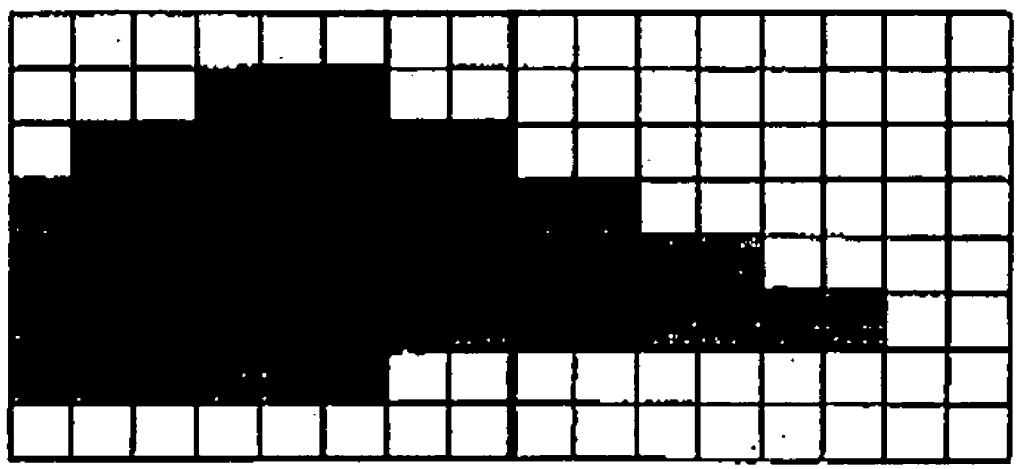

FIG. 12 shows actual states of the pixel data pieces being stored in the cache memory. FIG. 12A shows the state of the pixel data pieces of the area 1001 of FIG. 10 being stored therein while FIG. 12B showing the state of the pixel data pieces of the area 1101 of FIG. 11 being stored therein. Here, in FIGS. 12A and 12B, pixels in fact having no pixel data pieces—a pixel with a coordinate point (0, 0) in FIG. 12A, for example—store mask data (i.e. data to be transferred but not written to the frame memory) therein. The cache memory control circuit 104 identifies the mask data, and exercises control so that no data is written in corresponding coordinate points at the time of transfer from the cache memory 103 to the frame memory 105.

It is designed that the pixel data pieces are written to the cache memory so as to be split in proper accordance with the unit of the burst transfers, as shown in FIGS. 10 to 12. As a result, no redundant accesses are generated when the data is written from the cache memory to the frame memory. Thus, unnecessary accesses from the cache memory to the frame memory are reduced.

Figure 13A:
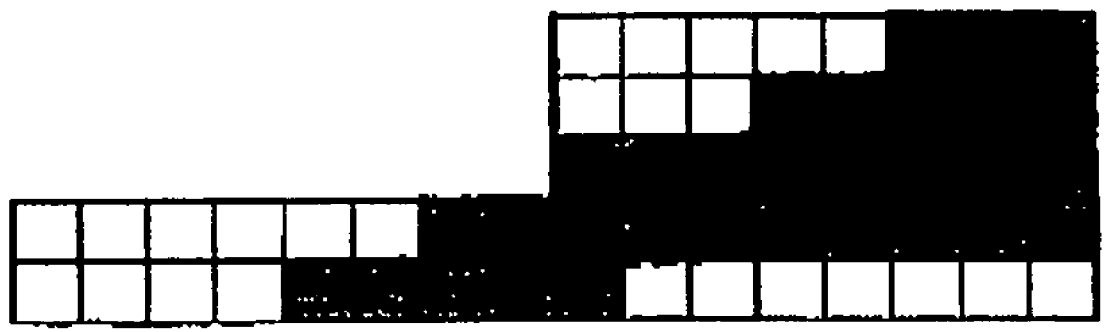
FIG. 13 is a conceptual diagram showing the number of accesses made to the frame memory from the cache memory according to the method of the present invention.
Figure 13B:
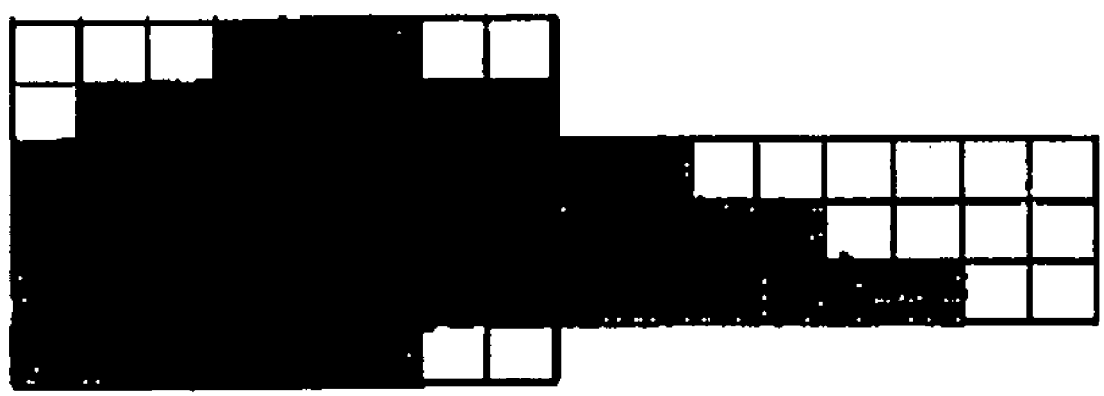

FIG. 13 is provided in order to illustrate the actual number of accesses. FIG. 13A corresponds to FIG. 12A while FIG. 13B corresponding to FIG. 12B.

In the case of FIG. 13A, the number of accesses from the cache memory 103 to the frame memory 105 is seven. On the other hand, in the case of FIG. 13B, nine accesses are made from the cache memory 103 to the frame memory 105. In short, at the time of storing the data of the triangle ABC in the frame memory 105, totally sixteen accesses from the cache memory to the frame memory take place. Thus, a difference in the number of accesses between the present invention and the conventional method is 22−16=6. When a larger image is stored in the frame memory, this difference becomes greater, and accordingly, the time period shortened due to a decrease in the number of accesses from the cache memory to the frame memory also increases.

The way of writing data from the GE 102 to the cache memory 103 is described in the section of Operations.

<Operations>

Figure 14:
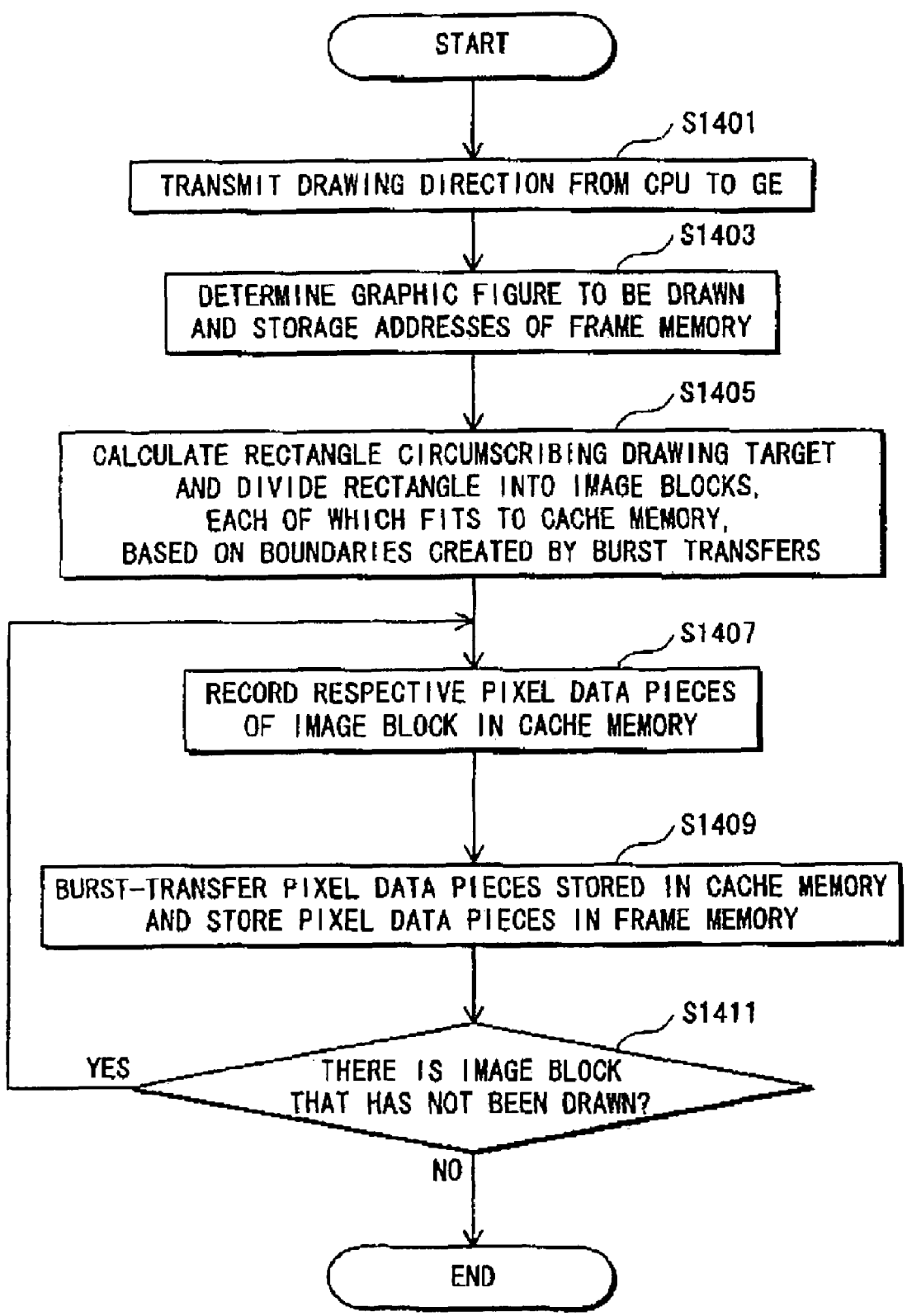
FIG. 14 shows operations taking place in the drawing apparatus, up to the point of drawing data being stored in the frame memory.

Finally, the operations of the drawing apparatus 100 according to the present invention from the point when a direction is transmitted from the CPU to the point when drawing data is stored in the frame memory are explained with the aid of a flowchart of FIG. 14. The section here starts with a description of the general operations of the present invention based on the flowchart of FIG. 14, which is followed by a concrete description with the use of FIGS. 10 to 13.

In the drawing apparatus 100, first, a drawing direction is transmitted from the CPU 101 to the GE 102 (Step S1401), as shown in FIG. 14. The content of the drawing direction is very simple. For example, it is a direction to the GE 102 to draw the triangle ABC in red.

The GE 102 analyzes the direction from the CPU 101. According to the analysis results, the GE 102 calculates which color to be positioned on which coordinate point, and calculates under which address of the frame memory each pixel data piece should be stored (Step S1403).

Then, the GE 102 calculates the minimum x coordinate x1, minimum y coordinate y1, maximum x coordinate x2 and maximum y coordinate y2 of a graphic figure formed according to the drawing direction. In the case when x1 is not a multiple of 8, the GE 102 calculates an x coordinate x3, which is smaller than and closest to x1 and is a multiple of 8. If x1 is a multiple of 8, then x1 becomes x3. Additionally, in the case when the maximum x coordinate is not 8n−1 (n: an integer no smaller than 1), the GE 102 calculates an x coordinate x4, which is 8n−1 larger than and closest to the maximum x coordinate. If the maximum x coordinate x2 is 8n−1, then x2 becomes x4. Subsequently, the GE 102 calculates a rectangle having the left side on x3, the right side on x4, the top side on y1 and the bottom side on y2. The GE 102 divides the rectangle, (i) in the x-axis direction from the left side, by the width of the cache memory in the x-axis direction—i.e. a unit of 16 pixels, and (ii) in the y-axis direction from the bottom, by the width of the cache memory in the y-axis direction—i.e. a unit of 8 pixels, to thereby generate image blocks (Step S1405).

The GE 102 selects, from the image blocks generated by dividing the rectangle, one image block which has not yet been stored in the frame memory, and records the pixel data pieces of the image block in the cache memory 103 (Step S1407).

After the GE 102 completes the recording to the cache memory 103, the cache memory control circuit 104 then causes the cache memory 103 to burst-transfer the pixel data pieces stored in the cache memory 103 to the frame memory 105 (Step S1409).

The GE 102 examines whether there are pixel data pieces that have not been stored in the frame memory 105 (Step S1411). In the case when unstored pixel data pieces are left (Step S1411: YES), the process is returned to Step S1407 and the operations from then on are performed. In the case if unstored pixel data pieces are not left, the process is finished since there is nothing left to be drawn.

Next is described a specific example of this processing flow along with the flowchart of FIG. 14, with the aid of FIGS. 4, 10 and 11.

First, the CPU 101 transmits, to the GE 102, a drawing direction indicating "to draw in red, a triangle formed by connecting three points A(21, 3), B(5, 9) and C(29, 7)" (corresponding to Step S1401).

After analyzing the transmitted drawing direction, the GE 102 calculates which color to be positioned on which coordinate point and under which address of the frame memory 105 each pixel data piece should be stored (corresponding to Step S1403).

Next, to calculate a rectangle circumscribing the triangle, the GE 102 calculates the x coordinate x1 for the left side, the x coordinate x2 for the right side, the y coordinate y1 for the top side and the y coordinate y2 for the bottom side. In this instance, x1 is 5; x2, 29; y1, 3; and y2, 9.

Since x1 is not a multiple of 8 (here, a remainder is left when x1 is divided by 8, i.e. 5/8=0, remainder 5), the GE 102 finds the x coordinate x3 which is smaller than 5 and is a multiple of 8. In this instance, x3 is 0. x2 is not 8n−1, where n is an integer no smaller than 1 (a remainder is left when a value obtained by adding 1 to x2 is divided by 8, i.e. (29+1)/8=24, reminder 6), and therefore the GE 102 finds the x coordinate x4 which is larger than 29 and is 8n−1. In this instance, x4 is 31.

The rectangle formed by connecting four points (0, 9), (0, 3), (31, 9) and (31, 3) is divided (i) in the x-axis direction, by the width of the cache memory in the x-axis direction, and (ii) in the y-axis direction, by the width of the cache memory in the y-axis direction. That is, in the x-axis direction, the rectangle is delimited at the boundary line between the coordinates 15 and 16 in the x-axis direction. In the y-axis direction, although there is no need to divide the rectangle since the graphic figure to be drawn, i.e. the triangle ABC, is fit into the cache memory all at once here, the rectangle is divided at the boundary line between the coordinates 1 and 2 in the y-axis direction only a few divisions are needed since the triangle ABC of this example is not large; however, in the case where a graphic figure much larger than this is to be drawn, a rectangle obtained for the graphic figure is divided, (i) in the x-axis direction, in increments of 16 pixels from the left side, and (ii) in the y-axis direction, in increments of 8 pixels from the top side (corresponding to Step S1405).

Generated by dividing the rectangle in such a way are the image blocks 1001 and 1101 shown in FIGS. 10 and 11, respectively. It is a matter of course these image blocks overlap with the entire storage area of the cache memory 102.

The GE 102 writes, to the cache memory 103, pixel data pieces of these image blocks generated by dividing the rectangle (corresponding to Step S1407). The GE 102 performs, based on the drawing direction from the CPU 101, calculation in which lines AB, BC and CA are formed in a line color defined as R:1, G:1 and B:0 and the inside region enclosed by the lines is filled with a color defined as R:1, G:1 and B:0, and thereby the pixel data pieces to be written are determined. FIG. 12A shows the data stored in this step, The pixel data pieces written to the cache memory by the GE 102 are burst-transferred to the frame memory 105 in increments of 8 pixels, and each is stored in a corresponding address location in the frame memory 105 by the control of the cache memory control circuit 104 (corresponding to Step S1409).

After the storage, the GE 102 examines whether there is a remaining image block (corresponding to Step S1411). In this case, the image block 1101 is still left (corresponding to Step S1411: YES), and therefore the GE 102 writes pixel data pieces included in the image block 1101 to the cache memory 103 (corresponding to Step S1407). The state of the pixel data pieces of the image block 1101 being written in the cache memory 103 is shown in FIG. 12B.

The pixel data pieces stored as shown in FIG. 12B are burst-transferred by the cache memory control circuit 104 from the cache memory 103 to the frame memory 105.

As a result, in the frame memory 105, the pixel data pieces are stored in the state illustrated in FIG. 4.

As has been described, since the unit of the burst transfers is taken into account for the transfer from the cache memory to the frame memory, redundant burst transfers to the same sections in the frame memory are eliminated, and accordingly, the time period for writing all pixel data pieces to the frame memory after the drawing direction is transmitted from the CPU can be shortened by the time required to perform the redundant burst transfers.

Note that, as compared with the conventional method, the cache memory of the present invention may have a lower use efficiency in relation to graphic figures. This is because, while the conventional method stores as many pixel data pieces as possible in the cache memory at the beginning, as shown in FIG. 7A, the present invention takes into account the unit of the burst transfers, as shown in FIG. 12A. As a result, it is sometimes the case with the present invention that the cache memory includes much blank space, which can be said therefore that the efficiency is lowered. An adverse effect resulted from this is an increase in the number of writing operations from the GE 102 to the cache memory 103.

However, as already mentioned, accesses from the GE 102 to the cache memory 103 can be achieved at a high speed. A period of time increased by the increase in the number of writing operations is insignificant, as compared with the time period shortened by a decrease in the number of writing operations from the cache memory to the frame memory consequently, it is possible to virtually shorten the overall writing period.

<Additional Particulars>

The drawing apparatus 100 has been explained based on the above embodiment; however, it is a matter of course that the drawing apparatus 100 of the present invention is not confined to the above embodiment. Next are described modifications of the present invention.

(1) The above embodiment is explained assuming that the cache memory and frame memory are two-dimensional array memories for easier comprehension; they are, however, not limited to two-dimensional array. In addition, the data pieces do not have to be stored under consecutive addresses, and all required is that data pieces necessary for the burst transfer are in the cache memory. In this case, the cache memory could be a random-access memory. Note however that storing consecutive pixel data pieces on the coordinate system in storage areas under consecutive addresses eliminates the trouble of specifying which pixel to be transferred to where at the time of the transfer, which allows a simple design of the drawing apparatus.

(2) In the above embodiment, the cache memory and the frame memory store therein 128 and 480 pixels, respectively;

however, the present invention is not limited to these numeric values. For example, the cache memory may store pixel data pieces for 12,288 (128×96) pixels while the frame memory storing pixel data pieces for 3,225,600 (1920×1680) pixels. Note that it is desirable that the storage capacity of the cache memory be an integral multiple of the unit of the burst transfers for an image transfer in order to achieve efficient usage of the cache memory.

(3) In the above embodiment, the transfer from the cache memory to the frame memory is carried out in increments of 8 pixels; however, the present invention is not limited to this number of pixels. Providing more signal lines in the memory bus enables transfer of more pixels, although this incurs an increase of production costs.

In addition, the number of pixels transferred can be found by dividing the amount of data transferred by the memory bus per unit time by the data amount of one pixel.

(4) In the above embodiment, to provide an easy way to store pixel data pieces in the cache memory, the drawing target is circumscribed by a rectangle, the rectangle is then divided into image blocks, each of which can fit into the cache memory, and the divided image blocks are then stored in the cache memory. However, with this method, the rectangle possibly includes therein a lot of areas having no data pieces of the drawing target.

In order to minimize the possible inefficiency of the above embodiment, the following method may be employed, for example. Note that the capacity of the cache memory is the same as one shown in FIG. 2.

First, the GE 102 detects a pixel with a coordinate point of the minimum x and the maximum y of the drawing target. The GE 102 then calculates a coordinate point A whose y coordinate is the same as that of the pixel but its x coordinate is smaller than the minimum x and is a multiple of B. The GE 102 also calculates a coordinate point B whose x coordinate is the same as that of the coordinate point A but the y coordinate is smaller than that of the coordinate point A by 8, as well as a coordinate point C whose y coordinate is the same as that of the coordinate point A but its x coordinate is larger than that of the coordinate point A by 16. Furthermore, the GE 102 calculates a coordinate point D whose y coordinate is the same as that of the coordinate point B while its x coordinate being the same as that of the coordinate point C. Then, a rectangle formed by connecting these four points A, B, C and D with straight lines is used as an image block, and the GE 102 stores, in the cache memory, necessary pixel data pieces within the image block. The pixel data pieces recorded in the cache memory are then stored in the frame memory.

Subsequently, the same processing is performed on the remaining part after the already-stored part is removed, and the processing is repeated until all data of the drawing target is stored. Herewith, it can be achieved to minimize unnecessary writing operations to the cache memory, that is, blank space in the cache memory cart be reduced.

(5) The above embodiment is explained assuming a situation where a graphic figure is to be written, for the first time, to the frame memory having no previously stored data therein, or where a graphic figure is written to the frame memory by overwriting previously stored data therein. However, graphic figures already stored in the frame memory may be used instead.

In the case of modifying a graphic figure stored in the frame memory, for example, the following procedure may be adopted. Pixel data pieces are once read from the frame memory, modification is made only to part need to be modified according to a direction from the GE 102, and the modified pixel data pieces are restored in the frame memory. In this case also, the pixel data pieces are read out so as to be divided in increments of the unit of the burst transfers and stored in the cache memory. Subsequently, the pixel data pieces of the cache memory after the modification are burst-transferred and restored in the frame memory.

This enables partial modifications, and the GE 102 does not have to write all pixel data pieces to the cache memory 103. Accordingly, it is possible to speed up the writing operations to the frame memory by just that much.

(6) Although it is not specifically described in the above embodiment, the use efficiency of the cache memory of the present invention may also be improved by changing the shape of the array of the cache memory (vertically or horizontally long) based on the shape of a drawing target—e.g. in the case of the image being vertically long, the array of the cache memory is set to be vertically long, as described in Japanese Laid-Open Patent Application Publication No. H1-262585. In this case also, the writing operations to the cache memory are conducted in a manner that redundant accesses to the same addresses in the frame memory through the burst transfers are avoided, in accordance with the purpose of the present invention.

(7) The above embodiment illustrates an example of carrying out one drawing direction—i.e. drawing of the triangle ABC; however, multiple drawing directions may be performed. Such multiple drawing directions may be "to draw the triangle ABC in red and then draw thereon a circle having the center at Point D (18, 5) and radius 4 in purple," for example. In this case, needless trouble would be caused and a longer time for the drawing process would be required if a procedure is taken in which the GE 102 draws the data of the triangle ABC and stores the data in the frame memory, and then draws the circle and again stores the data in the frame memory. Therefore, the GE 102 may be structured to, in such a case where drawing coordinates according to multiple drawing directions overlap each other, perform transparency processing, filling, or synthetic processing on the overlapped area of each graphic figure based on the drawing directions, and to require only one session for writing data to each of the cache memory and the frame memory.

(8) In the embodiment, the number of tone levels of each color is set as above; however, each of RGB may have 0-255 levels.

(9) The present invention may be a method of accomplishing the above embodiment. In addition, the present invention may be a computer program indicating the processing procedure that causes a computer of a drawing apparatus to execute the method. The computer program may be recorded on various recording media including a flexible disc, a hard disc device, a CD (Compact Disc), a DVD (Digital Versatile Disc), a BD (Blu-ray Disc), a MO (Magneto-Optical) disc, a flash memory and a semiconductor memory.

(10) The present invention may be achieved by an LSI (Large Scale Integration) or a VLSI (Very Large Scale Integration) that is installed in a drawing apparatus and stores image data in the cache memory as described in the above embodiment. In this case, a single LSI or a combination of multiple LSIs may be used to achieve the present invention.

INDUSTRIAL APPLICABILITY

The present invention is beneficial for a drawing apparatus required to perform high-speed drawing in the image processing.

What is claimed is:

1. A drawing apparatus that records image data in a frame memory, comprising:

a cache memory;

an area specifying unit configured to specify an area of the frame memory, for recording the image data, to be a drawing target;

a recording unit configured to (i) determine partial image data pieces in a case where the frame memory is sectionalized into blocks by one or more boundaries, specified by a byte count to be a unit of a burst transfer, each of the partial image data pieces being a part of the image data and recorded in a corresponding one of the blocks including therein the specified area, and (ii) record each of the determined partial image data pieces in the cache memory in a distinguishable manner; and a memory-to-memory transfer control unit operable to carry out the burst transfer of each of the partial image data pieces recorded in the cache memory to the corresponding one of the blocks within the frame memory.

2. The drawing apparatus of claim 1, wherein
the recording unit records, within the cache memory, the determined partial image data pieces in recording areas having consecutive addresses.

3. The drawing apparatus of claim 1, wherein
a size of each of the blocks is determined based on number of signal lines of a memory bus connecting the cache memory to the frame memory.

4. The drawing apparatus of claim 1, wherein
a size of each of the blocks is determined based on a data volume that can be transferred in the burst transfer.

5. The drawing apparatus of claim 1, wherein
a storage capacity of the cache memory is an integral multiple of a storage capacity corresponding to the blocks.

6. A recording method for recording image data in a frame memory via a cache memory, comprising the steps of:
specifying an area of the frame memory for recording the image data to be a drawing target;

determining partial image data pieces in a case where the frame memory is sectionalized into blocks by one or more boundaries specified by a byte count to be a unit of a burst transfer, each of the partial image data pieces being a part of the image data and being to be recorded in a corresponding one of blocks including therein the specified area, and recording each of the determined partial image data pieces in the cache memory in a distinguishable manner; and burst-transferring each of the partial image data pieces recorded in the cache memory to the corresponding one of blocks within the frame memory.

7. A computer-readable recording medium, having recorded thereon a recording program used in a drawing apparatus that records image data in a frame memory via a cache memory and causing a computer to execute the steps of:
specifying an area of the frame memory for recording the image data to be a drawing target;

determining partial image data pieces in a case where the frame memory is sectionalized into blocks by one or more boundaries specified by a byte count to be a unit of a burst transfer, each of the partial image data pieces being a part of the image data and being to be recorded in a corresponding one of blocks including therein the specified area, and recording each of the determined partial image data pieces in the cache memory in a distinguishable manner; and burst-transferring each of the partial image data pieces recorded in the cache memory to the corresponding one of blocks within the frame memory.

8. A drawing integrated circuit that records image data in a frame memory via a cache memory, comprising:
an area specifying unit operable to specify an area of the frame memory, for recording the image data, to be a drawing target;

a recording unit operable to (i) determine partial image data pieces in a case where the frame memory is sectionalized into blocks by one or more boundaries, specified by a byte count to be a unit of a burst transfer, each of the partial image data pieces being a part of the image data and recorded in a corresponding one of the blocks including therein the specified area, and (ii) record each of the determined partial image data pieces in the cache memory in a distinguishable manner; and a memory-to-memory transfer control unit operable to carry out a burst transfer of each of the partial image data pieces recorded in the cache memory to the corresponding one of the blocks within the frame memory.

* * * * *